United States Patent [19]
Weiler et al.

[11] Patent Number: 4,957,192
[45] Date of Patent: Sep. 18, 1990

[54] AUTOMATIC ADJUSTING DEVICE FOR A DISC BRAKE

[75] Inventors: Rolf Weiler, Frankfurt am Main; Claus-Peter Panek, Steinbach; Bodo Schmidt, Lauterbach, all of Fed. Rep. of Germany

[73] Assignee: Alfred Teves GmbH, Frankfurt am Main, Fed. Rep. of Germany

[21] Appl. No.: 334,740

[22] Filed: Apr. 6, 1989

Related U.S. Application Data

[63] Continuation of Ser. No. 154,773, Feb. 10, 1988, abandoned.

[30] Foreign Application Priority Data

Feb. 18, 1987 [DE] Fed. Rep. of Germany ....... 3705041

[51] Int. Cl.$^5$ ................... F16D 55/224; F16D 65/56
[52] U.S. Cl. ................... 188/71.9; 188/196 D; 192/111 A
[58] Field of Search ........... 188/196 D, 71.9, 72.6, 188/199, 202, 203, 106 F; 192/111 A

[56] References Cited

U.S. PATENT DOCUMENTS

| | | | |
|---|---|---|---|
| 2,312,384 | 3/1943 | Browall | 188/196 D |
| 3,783,981 | 1/1974 | Burgdorf | 188/71.9 X |
| 3,878,923 | 4/1975 | Farr | 188/196 D |
| 4,598,800 | 7/1986 | Marianu | 188/71.9 |
| 4,678,065 | 7/1987 | Erben et al. | 188/196 D |
| 4,719,997 | 1/1988 | Tsuruta | 188/71.9 |

FOREIGN PATENT DOCUMENTS

| | | | |
|---|---|---|---|
| 3514771 | 10/1986 | Fed. Rep. of Germany | 188/196 V |
| 1364423 | 8/1974 | United Kingdom | 188/196 D |
| 2175658 | 12/1986 | United Kingdom | 188/196 V |

Primary Examiner—George E. A. Halvosa
Attorney, Agent, or Firm—Robert P. Seitter

[57] ABSTRACT

An adjusting device for a disc brake comprised of a brake piston which, for the actuation of a brake shoe, is slidably arranged in a brake cylinder and which is actuatable by way of a hydraulic and a mechanical actuating device. Between the brake piston and the mechanical actuating device an adjusting member is provided which is composed of two adjusting elements interconnected by way of a thread without self-locking engagement. The adjusting member comprises a friction clutch having conical friction surfaces for fixation of one of the adjusting elements on mechanical actuation; and includes a spring which is supported on a stop formed fast with the housing and on a roller bearing seated on one of the adjusting elements. For the improved manufacture of the parts and in order to improve and facilitate the assembly, the accommodation sleeve comprises at least one groove extending substantially in the direction of the longitudinal axis of the accommodation sleeve.

7 Claims, 1 Drawing Sheet

AUTOMATIC ADJUSTING DEVICE FOR A DISC BRAKE

This application is a continuation of application Ser. No. 07/154,773 filed Feb. 10, 1988 now abandoned.

BACKGROUND OF THE INVENTION

The present invention relates to an automatic adjusting device for a disc brake.

An adjusting device for a disc brake is disclosed in German patent application DE-OS 35 05 411 A1. In this adjusting device, the friction clutch is arranged between the adjusting nut and a mechanically actuatable clamping member. In the clutch area, the adjusting nut includes a readily outwardly extending trumpet-like expansion on which the friction surface is designed which cooperates with a corresponding friction surface on the clamping member. The clamping member extends correspondingly far outwards in order to embrace the trumpet-like expansion of the adjusting nut from the outside. Although this known solution works largely satisfactorily, the requirements for manufacturing effort are still not completely fulfilled. For this reason, a solution has been proposed in German patent application P 36 43 923.1 (corresponding to U.S. Pat. No. 4,842,103) which provides reduced manufacturing effort. In this patent application, the accommodation sleeve is made from a straight tubular member and is pressed into a corresponding bore.

SUMMARY OF THE INVENTION

It is an object of the present invention to devise an automatic adjusting device which is further improved with respect to the manufacture of the component parts and their assembly. This object is achieved by the present invention in that the accommodation sleeve comprises at least one groove extending substantially in the direction of the longitudinal axis of the accommodation sleeve. The housing bore incorporating the accommodation sleeve can be designed with tolerances more favorable for manufacturing. Furthermore, a greater anti-torsion reliability of the accommodation sleeve is attained by this solution. The groove permits the air to escape optimally during "pressureless" venting, the venting ability being improved as a result. Manufacturing costs are reduced by the accommodation sleeve being an extrusion-molded part or a sintered part. Since this solution obviates the need for additional compensating washers to compensate for lengths projecting due to caulking and the like, it therefore improves and facilitates the assembly.

According to an advantageous embodiment of this invention, the groove or the grooves are of substantially U-shaped cross section. This cross section can be easily made during manufacture, in particular as concerns an extrusion-molded part or a sintered part. According to another expedient embodiment, the accommodation sleeve comprises a fastening portion for the bowl-type spring retainer as well as a fastening portion for the press-fit mounting, with the grooves being arranged in particular in the fastening portion for the press-fit mounting. Suitably, the fastening portions are arranged offset to one another in axial direction and/or in radial direction. In embodiments utilizing several grooves, expediently, the grooves preferably are arranged asymmetrically in respect of a plane of reference. This facilitates machining during the centerless grinding action. During calibration, the grooves also may be arranged symmetrically.

According to another feature of the instant invention, a spring is interposed between the accommodation sleeve and the mechanic actuating device, in particular the clamping member. In this respect, it has been found to be expedient if the accommodation sleeve comprises a conical surface facing the mechanic actuating device which allows inserting and centering the spring in a simple fashion during mounting.

BRIEF DESCRIPTION OF THE DRAWING

These and other advantages of the present invention will now be described in greater detail in conjunction with the accompanying drawing wherein.

DETAILED DESCRIPTION OF A PREFERRED EMBODIMENT

Figure 1:
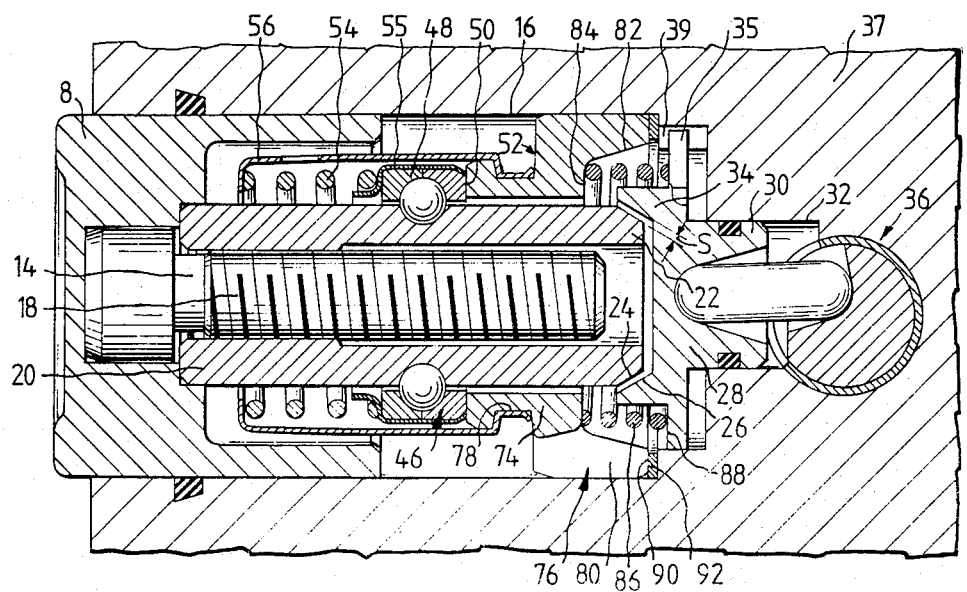
FIG. 1 is a partial longitudinal cross-sectional view through an adjusting device in accordance with the present invention.
Figure 2:
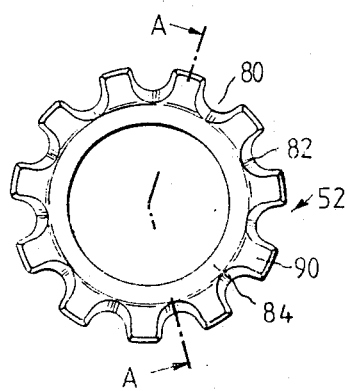
FIG. 2 is a cross section view on a reduced scale through the accommodation sleeve of the adjusting device illustrated in FIG. 1; and, FIG. 3 is a cross-sectional view through the accommodation sleeve taken along the line A—A in FIG. 2.
Figure 3:
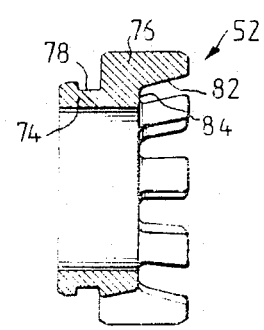

As only the piston of the disc brake is illustrated in the drawing, published and printed German document DE-OS 35 05 411 A1 and P 36 43 923.1 (and its corresponding U.S. Application) are referred to and hereby incorporated by reference as regards the design of an overall disc brake.

As in DE-OS 35 05 411 A1, an adjusting spindle 14 is fitted to the bottom of the brake piston 8 in a torsionally secured manner and extends coaxially through the hollow space formed by the brake pistion. Adjusting spindle 14 comprises a coarse thread 18 without self-locking engagement. An adjusting nut 20 arranged on the adjusting spindle 14 has a mating thread. Adjusting nut 20 is of substantially cylindrical shape and includes a conical friction surface 24 on its end remote from the piston. Consequently, nut 20 may be manufactured from a simple, possibly stepped tubular member in a manner that is very favorable to manufacture.

Cooperating with the conical friction surface 24 is another conical friction surface 26 which is provided on a clamping member 28. Clamping member 28 comprises a cylindrical portion 30 which is slidably arranged in a reduced-diameter bore portion 32, as well as an enlarged-diameter portion 34 on which the friction surface 26 is provided. Portion 34 of clamping member 28 outwardly embraces the end 22 of adjusting nut 20, the hand brake operational clearance S being maintained between the friction surfaces 24, 26. Since the adjusting nut does not have any radial expansion, the clamping member 28 also can be manufactured to have a very small diameter in the area of portion 34. A portion 35 located between portion 30 and portion 34 forms a radial projection which engages into a longitudinal groove 39 contained in housing 37, a torsion-preventing mechanism being provided thereby. In addition to clamping member 28, the mechanic actuating device further comprises an eccentric device 36 which acts upon clamping member 28 by way of a tappet.

The part of the adjusting nut 20 close to brake piston 8 carries a four-point ball bearing 46 whose inner bearing ring is formed by adjusting nut 20 itself. The outer bearing ring 48 of ball bearing 46, which outer ring is divided into two parts along a plane extending vertically to the axis of rotation, abuts on a shoulder 50 of an accommodation sleeve 52 which is secured in the brake housing. The parts of the two-part outer bearing ring 48, are enclosed by a sleeve 55. Bearing against sleeve 55 of the outer bearing ring 48 is a spring 54 which takes support on a bowl-type spring retainer 56 that is fastened on accommodation sleeve 52. In this embodiment, the bowl-type spring retainer 56 is secured to accommodation sleeve 52 by the provision of indentations. As an alternative to this fastening method, a slip-joint is also possible which does not necessitate the provision of corresponding recesses or indentations at the accommodation sleeve 52. Accommodation sleeve 52 is mounted in snug fit in bore portion 16. Fitting of the adjusting device is performed by merely pressing in the accommodation sleeve through adjusting nut 20 and bearing 46.

Accommodation sleeve 52 forms a first portion 74 of substantially cylindrical configuration as well as a second portion 76 axially and radially offset thereto. First portion 74 contains a circumferential groove 78 serving to fasten the bowl-type spring retainer 56. Second portion 76 forms the fastening portion for the press-fit mounting of accommodation sleeve 52. It is provided with a plurality of through-grooves, one of which is assigned reference numeral 80. The outwardly open grooves extend in radial direction until approximately the first portion 74 of accommodation sleeve 52. They are arranged asymmetrically in relation to a radially extending plane. On the inside, the second portion 76 forms a conical surface 82 which passes over into a radially extending surface 84 in the area of the first portion 74. Taking support on the radially extending surface 84 is one end of a spring 86, whose other end abuts on an abutment surface 88 of clamping member 28. A washer 92 is located between the end surface 90 of accommodation sleeve 52 and a step designed in housing 37.

For mounting, the spring is expediently preassembled on clamping member 28 and, to this effect, is seated with one of its ends on the projecting portion 34 of the clamping member. During the press-in action, the preassembled spring is inserted by way of the conical surfaces and is centered thereby.

What is claimed is:

1. An automatic adjusting device for a disc brake, with the disc brake comprising a brake piston which, for the application of a brake shoe, is displaceably arranged in a brake cylinder and which is actuatable by means of a hydraulic and a mechanical actuating device;

said adjusting device further comprising an extensible adjusting member arranged between the brake piston and the mechanical actuating device and including two adjusting elements interconnected by way of a thread in non-self-locking engagement; and said adjusting device further comprising a friction clutch having conical friction surfaces for fixing the position of one of the adjusting elements upon mechanical actuation, with one of the conical friction surfaces being provided on one of the adjusting elements, while the other friction surface is provided on a mechanically actuatable clamping member, and said adjusting device further comprising a bowl-type spring retainer for a first spring, said retainer secured to the brake housing by virtue of an accommodation sleeve, said accommodation sleeve being seated in a portion of a bore of the brake housing between said retainer and said clamping member, a second spring mounted between said portion of said bore and said clamping member and engaging said accommodation sleeve and said clamping member, wherin said accommodation sleeve is comprised of separate finger-like projections having radially extending surfaces continuing into a conical surface facing the mechanical actuating device, said finger-like projections being resilient in the radial direction for press-fitted securement.

2. The automatic adjusting device as claimed in clain 1 wherein said radially extending surfaces of said accommodation sleeve support one end of a second spring.

3. the automatic adjusting device as claimed in claim 2 wherein said second spring is interposed between said accommodation sleeve and said clamping member.

4. The automatic adjusting device as claimed in claim 3 wherein the second spring is preassembled on the clamping member.

5. The automatic adjusting device as claimed in claim 3 wherein said second spring is preassembled when mounted.

6. The automatic adjusting device as claimed in claim 2 wherein said two adjusting elements comprise an adjusting spindle and an adjusting nut.

7. The automatic adjusting device as claimed in claim 1 wherein said two adjusting elements comprise an adjusting spindle and an adjusting nut.

* * * * *